United States Patent
Kuhn et al.

(10) Patent No.: US 7,792,529 B2
(45) Date of Patent: Sep. 7, 2010

(54) DECISION MECHANISM FOR HANDOVER EXECUTION IN A CELLULAR RADIO COMMUNICATIONS SYSTEM

(75) Inventors: Edgar Wolfram Kuhn, Stuttgart (DE); Anton Ambrosy, Tiefenbronn (DE)

(73) Assignee: Alcatel Lucent, Paris (FR)

( * ) Notice: Subject to any disclaimer, the term of this patent is extended or adjusted under 35 U.S.C. 154(b) by 780 days.

(21) Appl. No.: 11/678,065

(22) Filed: Feb. 23, 2007

(65) Prior Publication Data

US 2007/0232311 A1    Oct. 4, 2007

(30) Foreign Application Priority Data

Mar. 28, 2006   (EP)   ................... 06300297

(51) Int. Cl.
*G06F 15/16*   (2006.01)
(52) U.S. Cl. ...................... 455/436; 370/331
(58) Field of Classification Search ............. 455/436, 455/439, 442, 433; 370/328, 331, 338, 351–356
See application file for complete search history.

(56) References Cited

U.S. PATENT DOCUMENTS

| 4,670,899 A | 6/1987 | Brody et al. |
| 2005/0239472 A1 | 10/2005 | Wei |

FOREIGN PATENT DOCUMENTS

| WO | WO 01/80581 A1 | 10/2001 |
| WO | WO 02/089514 A1 | 11/2002 |

*Primary Examiner*—Sam Bhattacharya
(74) *Attorney, Agent, or Firm*—Fay Sharp LLP

(57) ABSTRACT

A method for taking a handover decision in a cellular communications system, wherein a communications network detects a need for initiating a handover for at least one mobile device from a source cell to a selected target cell, and further calculates a virtual traffic load indicator for the source cell after a virtual handover execution of the mobile device from said source cell to said target cell, calculates a virtual traffic load indicator for the target cell after a virtual handover execution of the mobile device from said source cell to said target cell, compares the calculated virtual traffic load indicators, and takes a decision to execute or not to execute said handover according to said comparison.

20 Claims, 1 Drawing Sheet

DECISION MECHANISM FOR HANDOVER EXECUTION IN A CELLULAR RADIO COMMUNICATIONS SYSTEM

BRIEF DESCRIPTION OF THE INVENTION

The invention is based on a priority application EP 06300297.6 which is hereby incorporated by reference.

The present invention relates generally to handover mechanisms in cellular radio communications systems and more particularly to a method of decision for carrying out a handover or not.

In a cellular radio communications system the coverage area of the communication network is divided into a plurality of cells and the communication between said communications network and a mobile device located in a specific cell thereof is supported by at least one access point in each cell. Handover mechanisms are typically used in said cellular communications systems to provide seamless service coverage to the mobile device when it moves from one cell to the other, but handover algorithms may not be limited to management of the mobility of the mobile device. Handover may also be carried for network traffic load balancing purposes.

Load balancing between access points is needed since each access point has a limited capacity. The communication network may detect that a certain cell has reached maximum or a certain level of resource capacity usage and decide to transfer a connection in progress between a mobile device and said cell to another cell which is less loaded.

The performance of the handover mechanism is extremely important since handovers have a direct effect on network performance and user satisfaction. Frequent handovers reduce the quality of service and increase the signaling load of the communication network because each handover requires a significant amount of network resources to reroute an established connection to a new cell. This happens for example in situations where a mobile device moves to an overlap region between two cells and the fluctuations in the signal strength received by the access points cause a connection to be repeatedly handed over back and forth between said access points, causing the known "ping-pong effect". In some systems a hysteresis algorithm is applied to the comparison of the signal strength measures which prevents this effect, but on the other hand it causes unnecessary delay to handovers not affected by the ping-pong effect, which again reduces network performance.

In case of handovers intended for network traffic load balancing purposes a lot of ping-pong handovers may also occur if the mobile device is handed over from a first cell to a second cell, the handover causing in the second cell a higher load situation than in the first one and the load balancing mechanism then handing over the mobile device back to the first cell. A mobile communication network, which is the starting point of this invention and which suffers from the above mentioned problem is disclosed in U.S. Pat. No. 4,670,899. In said patent a method for balancing the load among cells by selectively transferring ongoing calls from to adjacent cells in accordance with traffic levels is implemented.

A handover process may comprise a detection step for assessing the need for a mobility or traffic load balance induced handover, a decision or protection step for determining in which conditions said handover shall be executed or avoided and a rerouting step using network, and implicit radio resources, for transferring an established connection to a new cell.

Sometimes the decision or protection step mechanism is not present and a decision to execute a handover is simply taken when the need for handover is detected.

SUMMARY OF THE INVENTION

The object of the present invention is to provide an improved handover decision mechanism for mobility or traffic load control induced handovers which reduces prejudicial handovers for the communications system.

The object is achieved by a method for taking a handover decision in a cellular communications system comprising a communications network divided into a plurality of cells, the communication between said communications network and a plurality of mobile devices located in a specific cell thereof being supported by at least one access point in each cell, the communications network detecting a need for initiating a handover for at least one mobile device from a source cell to a selected target cell, the method comprising
  calculating a virtual traffic load indicator for the source cell after a virtual handover execution of the mobile device from said source cell to said target cell;
  calculating a virtual traffic load indicator for the target cell after a virtual handover execution of the mobile device from said source cell to said target cell;
  comparing the calculated virtual traffic load indicators; and
  taking a decision to execute or not to execute said handover according to said comparison.

The object is also achieved by a network element, such as a radio network controller or an access point, of a cellular communications system comprising communication means with at least one plurality of access points, storing means for information about traffic load situation of the at least one access points, detection means for a need of initiating a handover of at least one mobile device from a source cell access point to a target cell access point for mobility or load balancing reasons, and means for executing said handover, further comprising means for
  calculating a virtual traffic load indicator for the source cell after a virtual handover execution of the mobile device from said source cell to said target cell;
  calculating a virtual traffic load indicator for the target cell after a virtual handover execution of the mobile device from said source cell to said target cell;
  comparing the calculated virtual traffic load indicators; and
  taking a decision to execute or not to execute said handover according to said comparison.

The object is further achieved by a communications network comprising the above disclosed network element.

The basic idea of the invention is to provide a network based handover decision mechanism, in which, when a handover need is detected in a cell i.e. a source cell, e.g. for mobility or traffic load balancing reasons, the communications network compares the virtual load traffic value of a target cell with the virtual traffic load value of a source cell after a virtual handover execution of a mobile device from the source cell to the target cell and takes a decision based on said comparison result. The network then may or may not execute said handover (rerouting of the mobile device connection) based on said decision. Alternatively it is also possible that, instead of comparing the traffic load values of the cells, the remaining traffic load capacity of the cells is compared.

This means that the communications network does not compare the actual traffic load situation of the source cell and target cell to take a handover decision. The communications network according to the invention takes a decision for executing a handover or not by taking into account the respective traffic load decrease in the source cell and traffic load increase in the target cell due to said handover execution.

An important advantage of network based handover decision mechanism according to the invention is that it improves overall network performance by reducing unnecessary ping-pong handovers due to load balancing reasons. By avoiding unnecessary rerouting of ongoing connections between cells, valuable network resources are not wasted. Further it protects the communications network from executing handovers which can cause a traffic overload situation in handover target cells.

Another important advantage of the method according to the invention is that there is no need for different treatment for handover execution due to network traffic load balancing or mobile device mobility reasons. The handover execution process for traffic load balancing purposes may comprises the same signaling procedure as for mobile device mobility management purposes.

Still another important advantage of the method according to the invention is that it works in systems with proactive handover preparation, that is, prior to handover execution the system may proactively detect a need for a handover and even select a target cell from a plurality of target cell candidates. This allows faster handover execution decisions. Proactive handover preparation may even be designed to distribute load induced handovers in a fair manner among all potential mobile devices and/or to eliminate rapid fluctuations of cell traffic load values e.g. by introducing predetermined threshold or hysteresis traffic value levels and timers associated to these values.

Further advantageous configurations of the invention emerge from the dependent claims, the following description and the drawings.

In a preferred embodiment of the invention the handover decision mechanism takes place in one access point of the communications network. In order to achieve this, the access points of the communications network system provide an indication of their cell traffic load situation to their neighbour access points. With this information, the access point of the source cell can calculate the virtual traffic load situation of the source cell and target cell after the virtual handover execution. The access points of the communications network may provide the indication of their cell traffic load situation periodically to their neighbour cells, or due to a certain event e.g. if load situation in the cell changes or the target cell is selected, or on request e.g. by the access point of the source cell.

An important advantage of this preferred embodiment is that the handover decision mechanism does not require the presence of a higher management central element which controls handover mechanisms for the access points of the communications network. According to the invention, the access points provide an indication of the cell traffic load situation among them for handover decision purposes and execute a handover according to said decision. The inventive method then allows for implementation of a decentralised handover mechanism in a cellular communications network.

In another preferred embodiment of the invention the target cell access point provides to the source cell access point an indication of a virtual traffic load situation after the virtual handover is executed. Said indication may be for example a traffic load value, a traffic load remaining capacity, a traffic load increase vector or a traffic load decrease capacity vector after the virtual handover execution. The advantage of this approach is that the source cell does not need to use complex algorithms to calculate the actual and virtual traffic load situation of the target cell. This is advantageous when the access points of the communications network belong to different manufacturers and use proprietary complex metrics and algorithms for the determination of the cell traffic load status. In this case the target access point may calculate the virtual traffic load situation of the cell after the virtual handover is executed and send a simple indication, e.g. remaining bit rate, to the source cell. For providing even higher traffic overload protection for the target cell, for example, in cases where the source cell is in an overload situation, the target cell may add to the indication of its virtual traffic load situation after virtual handover a certain amount of traffic load margin. Alternatively the source cell may add the traffic load increase vector after virtual handover execution received from the target cell to the actual traffic load situation of the target cell and further add said protection traffic load margin for calculating the virtual traffic load situation of the target cell after the virtual handover execution.

According to another preferred embodiment of the invention the source cell access point contributes to select the most appropriate target cell from a plurality of candidate target cells taking in consideration the traffic load situation of the candidate target cells. This is advantageous in a situation where the mobile device may be in a topological situation where, according to the signal strength received, multiple candidate target cells are available and the network according to the invention selects one of said target cells not only for radio signal strength conditions but also taking in consideration the traffic load situation of the candidate target cells. This avoids that a target cell is selected which, from the point of view of traffic load situation, is not the best choice e.g. if a candidate target cell is close to an overload situation or has a higher traffic load than the source cell.

According to still another preferred embodiment of the invention a decision to execute or not execute the handover may further take in consideration the handover situation e.g. coverage situation, network or target cell traffic load situation, type of handover, etc. the mobile device is in. For example, a decision to execute the handover may be taken even if the virtual traffic load value of the target cell is higher than the virtual traffic load value of the source cell in cases where the traffic load value of the target cell is considered not critical e.g. not exceeding a certain traffic load value threshold. This would be advantageous in systems where load balancing induced handover is not active or the load balancing mechanism only works when a certain network traffic load value is reached. Further, in systems with mobility induced handover it may happen that there is only one candidate target cell and thus the handover shall be allowed even if the virtual traffic load value of the target cell is higher than the virtual traffic load value of the source cell and the method of the invention would then consider the type of handover and the number of candidate target cells available. A combination of the above situations is also possible in which the mobility induced handover shall be done in a target cell close to or in traffic overload state (thus exceeding a certain traffic load threshold), and then the method would avoid such handover and let the mobile device maintain the connection with the source cell as long as this is practically possible i.e. signal strength link is sufficient and the situation in the target cell has not changed.

BRIEF DESCRIPTION OF THE DRAWINGS

In order that the invention may be clearly understood and readily carried into effect, one embodiment thereof will now be described, by way of example only, with the aid of FIGS. 1 and 2.

DETAILED DESCRIPTION OF THE DRAWINGS

Figure 1:
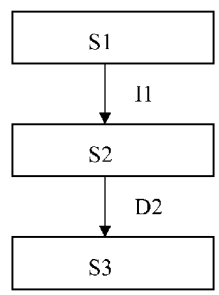
FIG. 1 shows a block diagram of a handover process according to the invention.

FIG. 1 shows a handover process comprising a detection step S1 providing information I1, a decision step S2 providing decision D2 and a execution step S3.

The detection step is typically used for assessing the need for a mobility or traffic load balance induced handover e.g. when the mobile device moves among cells or when the traffic load of a cell reaches a certain threshold. The detection step S1 may be triggered by the mobile device or from network side. The detection step S1 may detect the number of candidate target cells and even select one of them according e.g. to the radio signal strength received by the mobile device. In some systems this steps also comprises capabilities for distributing load induced handovers in a fair manner among all potential mobile devices and/or means to eliminate rapid fluctuations of radio signal strength reception or cell traffic load measure values e.g. by introducing predetermined threshold or hysteresis levels and timers associated to these levels. The detection step S1 provides information I1 with the need of a handover and any other additional information which has been calculated e.g. candidate target cells or selected target cell to the decision step S2 according to the invention.

Decision step S2, carried out according to the invention, provides decision information D2 which triggers handover execution in step S3 or blocks said execution according to source and target cell virtual traffic load situation comparison. According to the method of the invention the communications network calculates a virtual traffic load indicator of the source cell after a virtual handover execution of the mobile device from the source cell to the target cell, calculates a virtual traffic load indicator of the target cell after the virtual handover execution of the mobile device from the source cell to the target cell, compares the calculated virtual traffic load indicators, and provides a decision D2 to execute or not to execute said handover according to said comparison. Depending on the terms said traffic load indicator is expressed e.g. relative to the traffic load value or the remaining traffic load capacity of the cell the comparison is adapted to said terms i.e. the decision to execute said handover is taken if the virtual traffic load value of the target cell is lower than the virtual traffic load value of the source cell or if the virtual remaining traffic load capacity of the target cell is higher than the virtual remaining traffic load capacity of the source cell. Another relative terms of expressing the traffic load indicator may be used but the principle of the comparison is the same, avoid a handover execution in a target cell which has a traffic load higher than the traffic load of the source cell after a virtual handover of a predetermined mobile device connection is executed to said target cell.

Further advantageous implementations of the method according to the invention are already explained above and with the aid of the dependent claims. For example, the method of the invention may consider other parameters for taking the decision to execute or block the handover depending on the handover situation the mobile device is in. Such parameters can be for example, type of handover (mobility or load induced), traffic load situation in the target cell (above or below threshold) or number of candidate target cells.

Alternatively it is also possible that an activation or deactivation mechanism for the method according to the invention is provided, activation meaning the method making the virtual traffic load comparison and providing a decision based on said comparison and deactivation meaning the method providing always a predetermined decision which can be set, e.g. by the network operator, to "execute" or "not execute". It is also possible that said activation or deactivation is achieved automatically, for example by analyzing the handover situation the mobile device is in, as mentioned above.

Finally in a third step S3 the communications network may execute the handover which the need thereof has been detected in a first detection step S1 depending on the decision information D2 provided by the decision step S2 according to the invention. As already mentioned above, when the handover is executed significant network resources are used in order to transfer or reroute the mobile device connection from the source cell to the target cell. Avoiding unnecessary or prejudicial handover executions saves valuable network resources and increases network performance.

Figure 2:
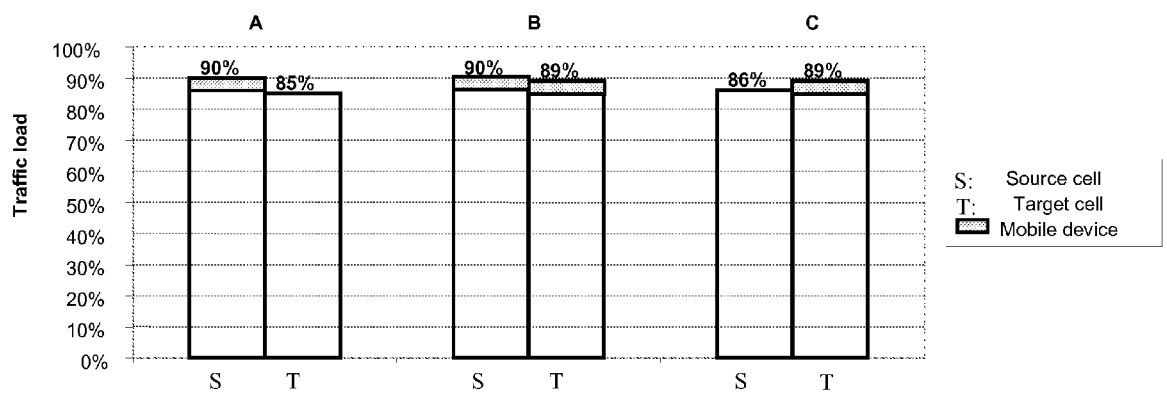
FIG. 2 shows an application example illustrating the benefits of the method of the invention.

FIG. 2 illustrates a simple example which summarizes the benefit of this invention.

The example is based on the following assumptions prior to a handover execution as shown in FIG. 2A: the traffic load of the source cell is 90%, the traffic Load of the target cell is 85% and the traffic load induced by the mobile device which shall be handed over to the selected target cell is 4%. In this situation, a decision mechanism of a conventional communications system which only compares the current traffic load of the source cell 90% with the traffic load of the target cell 85% prior to the handover execution, would take a decision to execute the handover because the load of the target access point is lower than the load of the source access point. But after handover execution the new traffic load situation of the source and target cells will lead to a ping-pong effect for traffic load induced reasons, because the load of the target cell 89% is higher than the load of the source cell 86%. The ping pong effect for load balancing purposes will repeat as long as the traffic situation of the source and target cells maintains in said traffic load levels wasting network resources.

FIG. 2B shows a second possibility in a system with a decision mechanism in which the current traffic load of the source cell 90% is compared with the traffic load of the target cell after handover execution 89%. Based on this comparison, the source access point would also take a decision to execute the handover because the load of the target cell is lower than the load of the source cell. But after handover execution the traffic load situation of the source and target cells will lead to a ping-pong effect for traffic load induced reasons, because the load of the target cell 89% is higher than the load of the source cell 86%. The ping pong effect for load balancing purposes will repeat as long as the traffic situation of the source and target cells maintains in said traffic load levels wasting network resources.

According to the method of the invention a handover would not be executed in this case because the decision step S2 according to FIG. 1 would provide a decision D2 to block said handover. The solution according to the invention is shown in FIG. 2C in which the virtual traffic load situation of the source and target cell is calculated and compared after a virtual handover execution. In the example of FIG. 2C the calculated virtual traffic load value of the source cell is 86% and that of the target cell is 89%, which means that, the traffic load value of the target cell would be higher than the traffic load value of the source cell in case said handover is executed, and this would cause more traffic load in the target cell (already approaching its limit capacity) and increase the risk of a ping-pong handover back to the source cell for network traffic load balancing reasons. The method according to the invention would then take a decision not to execute said prejudicial handover.

It is understood for a person skilled in the art that the mobile device may be a mobile phone, a PDA a laptop or any similar electronic device which comprises means to communication with an access point of a communications network. In the same sense an access point may be a conventional base station of cellular communications system.

For carrying out the steps of the handover decision method according to the invention a communications network element such as a radio network controller (RNC) comprising a centralized knowledge of the traffic load situation of a number of base stations could be used. Alternatively, for a communications network without an RNC the base stations or access points may comprise means for carrying out the method of the invention.

Finally, it has to be noted that the method of taking a handover decision according to the invention is not limited by the sole act of taking such decision, which may be also so expressed in prior art documents using the same expression but involving different steps, but by the way this decision for executing or blocking a handover in a communications network is carried out.

The invention claimed is:

1. A method for taking a handover decision in a cellular communications system comprising a communications network divided into a plurality of cells, the communication between said communications network and a plurality of mobile devices located in a specific cell thereof being supported by at least one access point in each cell, the communications network detecting a need for initiating a handover for at least one mobile device from a source cell to a selected target cell, the method comprising
  calculating a virtual traffic load indicator for the source cell after a virtual handover execution of the mobile device from said source cell to said target cell,
  calculating a virtual traffic load indicator for the target cell after a virtual handover execution of the mobile device from said source cell to said target cell,
  comparing the calculated virtual traffic load indicators, and
  taking a decision to execute or not to execute said handover according to said comparison.

2. The method according to claim 1 wherein the virtual traffic load indicator relates to a traffic load value of the cell and a decision to execute said handover is taken if the virtual traffic load value of the target cell is lower than the virtual traffic load value of the source cell.

3. The method according to claim 1 wherein the virtual traffic load indicator relates to a remaining traffic load capacity of the cell and a decision to execute said handover is taken if the virtual remaining traffic load capacity of the target cell is higher than the virtual remaining traffic load capacity of the source cell.

4. The method according to claim 1 wherein the access point of the source cell receives an indication of the target cell traffic load situation, takes the handover decision and executes the handover depending on said decision.

5. The method according to claim 4 wherein the access point of the target cell provides a virtual traffic load indicator of the target cell after the virtual handover execution.

6. The method according to claim 5 wherein the virtual traffic load indicator provided by the target cell is a virtual load increase vector.

7. The method according to claim 5 wherein the virtual traffic load indicator provided by the target cell comprises a certain overload traffic load protection margin added to the calculated traffic load situation after virtual handover.

8. The method according to claim 1 further comprising selecting the most appropriate target cell from a plurality of candidate target cells taking in consideration the traffic load situation of said candidate target cells.

9. The method according to claim 1 further considering other parameters for taking the decision to execute or not execute the handover.

10. Network element, such as a radio network controller or an access point, of a cellular communications system comprising communication means with at least one plurality of access points, storing means for information about traffic load situation of the at least one access points, detection means for a need of initiating a handover of at least one mobile device from a source cell access point to a target cell access point for mobility or load balancing reasons, and means for executing said handover, further comprising means for
  calculating a virtual traffic load indicator for the source cell after a virtual handover execution of the mobile device from said source cell to said target cell,
  calculating a virtual traffic load indicator for the target cell after a virtual handover execution of the mobile device from said source cell to said target cell,
  comparing the calculated virtual traffic load indicators, and
  taking a decision to execute or not to execute said handover according to said comparison.

11. The network element according to claim 10 further comprising means for selecting the most appropriate target cell from a plurality of candidate target cells, said means for selecting taking in consideration the traffic load situation of said candidate target cells.

12. The network element according to claim 10 further comprising means for considering other parameters for taking the decision to execute or not execute the handover.

13. The network element according to claim 10 wherein the virtual traffic load indicator relates to a traffic load value of the cell and a decision to execute said handover is taken if the virtual traffic load value of the target cell is lower than the virtual traffic load value of the source cell.

14. The network element according to claim 10 wherein the virtual traffic load indicator relates to a remaining traffic load capacity of the cell and a decision to execute said handover is taken if the virtual remaining traffic load capacity of the target cell is higher than the virtual remaining traffic load capacity of the source cell.

15. The network element according to claim 10 wherein the access point of the source cell receives an indication of the target cell traffic load situation, takes the handover decision and executes the handover depending on said decision.

16. The network element according to claim 15 wherein the access point of the target cell provides a virtual traffic load indicator of the target cell after the virtual handover execution.

17. The network element according to claim 16 wherein the virtual traffic load indicator provided by the target cell is a virtual load increase vector.

18. Communications network comprising a network element, such as a radio network controller or an access point, of a cellular communications system comprising communication means with at least one plurality of access points, storing means for information about traffic load situation of the at least one access points, detection means for a need of initiating a handover of at least one mobile device from a source cell access point to a target cell access point for mobility or load balancing reasons, and means for executing said handover, further comprising means for
  calculating a virtual traffic load indicator for the source cell after a virtual handover execution of the mobile device from said source cell to said target cell, calculating a virtual traffic load indicator for the target cell after a virtual handover execution of the mobile device from said source cell to said target cell, comparing the calculated virtual traffic load indicators, and taking a decision to execute or not to execute said handover according to said comparison.

19. The communication network according to claim 18, wherein the network element further comprises means for selecting the most appropriate target cell from a plurality of candidate target cells taking in consideration the traffic load situation of said candidate target cells.

20. The communication network according to claim 18, wherein the network element further comprises means for considering other parameters for taking the decision to execute or not execute the handover.

* * * * *